United States Patent
Larsson et al.

(10) Patent No.: US 7,747,250 B2
(45) Date of Patent: Jun. 29, 2010

(54) CALIBRATION METHOD TO ACHIEVE RECIPROCITY OF BIDIRECTIONAL COMMUNICATION CHANNELS

(75) Inventors: Peter Larsson, Solna (SE); Jiann-Ching Guey, Cary, NC (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 510 days.

(21) Appl. No.: 10/584,917

(22) PCT Filed: Dec. 23, 2004

(86) PCT No.: PCT/EP2004/014669
§ 371 (c)(1),
(2), (4) Date: Oct. 1, 2007

(87) PCT Pub. No.: WO2005/064871
PCT Pub. Date: Jul. 14, 2005

(65) Prior Publication Data
US 2008/0125109 A1    May 29, 2008

(30) Foreign Application Priority Data
Dec. 30, 2003  (SE) ..................................... 0303583
Jun. 30, 2004  (EP) ................................... 04015304

(51) Int. Cl.
*H04W 24/00*   (2009.01)
(52) U.S. Cl. .................... 455/424; 455/276.1; 342/174; 342/377; 370/252
(58) Field of Classification Search ................. 455/424, 455/276.1; 342/174, 377; 370/252
See application file for complete search history.

(56) References Cited

U.S. PATENT DOCUMENTS

| | | | | |
|---|---|---|---|---|
| 6,570,527 | B1 * | 5/2003 | Lindskog et al. | 342/174 |
| 6,738,020 | B1 * | 5/2004 | Lindskog et al. | 342/377 |
| 7,039,016 | B1 * | 5/2006 | Lindskog et al. | 370/252 |
| 2003/0185310 | A1 | 10/2003 | Ketchum et al. | |
| 2003/0224750 | A1 * | 12/2003 | Sampath | 455/276.1 |

FOREIGN PATENT DOCUMENTS

| | | |
|---|---|---|
| EP | 1 453 223 | 9/2004 |
| WO | 99/57820 | 11/1999 |
| WO | 03/049322 | 6/2003 |

OTHER PUBLICATIONS

Universal Mobile Telecommunications System (UMTS): Physical Layer Procedures (FDD) (3GPP TS 25.214 Version 3.4.0 Release 1999), Sep. 2000, ETSI TS 125 214 V3.4.0, pp. 1-48, XP002166612.
Universal Mobile Telecommunications System (UMTS): Physical Layer Procedures (FDD) (3GPP TS 25.214 Version 3.4.0 Release 1999), Sep. 2000, ETSI TS 125 214 V3.4.0, pp. 1-47.

* cited by examiner

*Primary Examiner*—David Q Nguyen
(74) *Attorney, Agent, or Firm*—Nixon & Vanderhye P.C.

(57) ABSTRACT

The present invention relates to a method and arrangement to enhance the communication performance in wireless communication systems. The method of the invention provides a method of calibrating at least one first radio node in a wireless communication network. The communication network comprises at least a first radio node and a second radio node, which can be arranged to be in radio communication with each other. The calibration method is based on that at least one representation of radio channel characteristics, which has been exchanged from one radio node to the other. Whereby inaccuracies and differences in transmit receive chains are compensated and channel reciprocity can be used.

23 Claims, 7 Drawing Sheets

CALIBRATION METHOD TO ACHIEVE RECIPROCITY OF BIDIRECTIONAL COMMUNICATION CHANNELS

This application is the US national phase of international application PCT/EP2004/014669 filed 23 Dec. 2004, which designated the U.S. and claims priority to SE 0303583-9 filed 30 Dec. 2003 and EP 04015304.1 filed 30 Jun. 2004, the entire content of each of which is hereby incorporated by reference.

FIELD OF INVENTION

The present invention relates to a method and arrangement to enhance the communication performance in wireless communication systems. In particular, the present invention relates to the reciprocity of bidirectional communication channels.

BACKGROUND OF THE INVENTION

The demand for traffic capacity, coverage and reliability in the wireless communication systems is seemingly ever-increasing. One bottleneck in the traffic capacity is the limited frequency spectrum available for communication purposes, the limitation being both physical—only part of the frequency spectrum is suitable for communication and the information content per frequency and time is limited, and organisational—the useful part of the spectrum is to be used for a number of purposes including: TV and radio broadcast, non-public communication such as aircraft communication and military communication, and the established systems for public wireless communication such as GSM, third-generation networks (3G), Wireless Local Area Networks (WLAN) etc. Recent development in the area of radio transmission techniques for wireless communication systems show promising results in that the traffic capacity can be dramatically increased as well as offering an increased flexibility with regards to simultaneously handling different and fluctuating capacity needs. Several promising techniques are Multiple-Input-Multiple-Output MIMO) see for example A. Goldsmith et al. "Capacity Limits of MIMO Channels", IEEE Journal on Selected Areas of Comm., VOL. 21, NO. 5, June 2003, and coherent combining based cooperative relaying, see for example Peter Larsson, "Large-Scale Cooperative Relaying Network with Optimal Coherent Combining under Aggregate Relay Power Constraints", in Proc. Of Future telecom Conference, Beijing, China, 9-10/12 2003. Compared to presently used transmission techniques such as TDMA (as used in GSM) and WCDMA (as used in UMTS), the above exemplified technique represents a much better usage of the available radio frequency spectrum. As an example of the capabilities of, but also the requirement set forth by, the new transmission techniques, the MIMO wireless systems will be briefly described with references to FIG. 1 (prior art). A comprehensive description of the basic principles as well as recent development and areas of research of MIMO is to be found in the above referred article by A. Goldsmith et al.

A radio link in a MIMO system is characterized by that the transmitting end as well as the receiving end is equipped with multiple antenna elements, as illustrated in FIG. 1. The idea behind MIMO is that the signals on the transmit (TX) antennas at one end and the receive (RX) antennas at the other end are "combined" in such a way that the quality (bit-error rate, BER) or the data rate (bits/sec) of the communication for each MIMO user will be improved. Such an advantage can be used to increase both the network's quality of service and the operator's revenues significantly. A core idea in MIMO systems is space-time signal processing in which time (the natural dimension of digital communication data) is complemented with the spatial dimension inherent in the use of multiple spatially distributed antennas. A key feature of MIMO systems is the ability to turn multipath propagation, traditionally regarded as a limiting factor in wireless transmission, into a benefit for the user. MIMO effectively takes advantage of random fading and when available, multipath delay spread, for multiplying transfer rates. Also schemes such as Transmit Diversity scheme with Rich Feedback (TDRF) and coherent combining based cooperative offer a dramatic increase in capacity and/or quality, as described in "Capacity achieving transmitter and receiver pairs for dispersive MISO channels" by K Zangi and L. Krasny, IEEE Trans. Wireless Commun., July 2002 and in "Optimal and Reduced Complexity Receivers for MISO Antenna Systems" by L. Krasny, S. Grant and K. Molnar, Proceeding IEEE Globecom 2003. The prospect of significant improvements in wireless communication performance at no cost of extra spectrum (only hardware and complexity are added) has naturally attracted widespread attention.

The transmitting principles of a multiantenna system will be described with reference to the schematic illustration of FIG. 1. A compressed digital source in the form of a binary data stream 105 is fed to a transmitting block 110 encompassing the functions of error control coding and (possibly joined with) mapping to complex modulation symbols (quaternary phase-shift keying (QPSK), M-QAM, etc.). The latter produces several separate symbol streams which range from independent to partially redundant to fully redundant. Each is then mapped onto one of the multiple TX antennas 115. Mapping may include linear spatial weighting of the antenna elements or linear antenna space-time preceding. After upward frequency conversion, filtering and amplification, the signals are launched into the wireless channel. N TX antennas 115 are used, and the transmitting block 110 may typically comprise means for N simultaneous transmissions. At the receiver, the signals are preferably captured by multiple antennas (M) 120 and demodulation and demapping operations are performed in the receiving block 125 to recover the message. The level of intelligence, complexity, and a priori channel knowledge used in selecting the coding and antenna mapping algorithms will vary a great deal depending on the application. This determines the class and performance of the multiantenna solution that is implemented.

Naturally, the multiantenna systems offer a transmit-receive diversity gain, similar to the existing smart antenna systems, but can also offer a fundamentally new advantage in the exploration of the space-time. This can be seen as the multiantenna systems transmit data over a matrix channel rather than a vector channel. The signal model of this type of multiantenna system can simplified be described as:

$$r = Hs + n \qquad (1)$$

wherein, r is the M×1 the received signal vector, s is the N×1 transmitted signal vector and n is an vector of additive noise terms, e.g. white Gaussian noise, and H is the M×N channel matrix for the transmitted signals between the transmitter and the receiver.

The multiplexing alone is as previously mentioned, not enough for achieving the dramatic increase in gain. Advanced coding/decoding and mapping schemes, i.e. the space-time coding, is essential. A knowledge of the radio channel is needed for the decoding already in today's existing wireless systems such as GSM and UMTS, and in the multiantenna systems this knowledge is absolutely critical. In some of the most promising implementation proposals for MIMO, the knowledge of the channel, represented by H, is used not only in the decoding performed in the receiver side, but also in the coding on the transmitting side as described in D. Gesbert et al. "From Theory to practice: An Overview of MIMO Space-Time Coded Wireless Systems", IEEE Journal on Selected Areas of Comm., VOL. 21, NO. 3, April 2003 and in WIPO publication nr WO 03005606.

The knowledge of the characteristics of the channel matrix H at the transmitter can be used to optimize coding and mapping. Not only MIMO systems exploits precise channel state information (CSI), but also for TDRF and coherent combining based cooperative relaying that inherently uses CSI knowledge for optimizing respective communication performance. A forward channel may typically be characterized either by sounding the channel in the forward direction with some training signal and then receive feedback from the other station informing about the channel characteristics, or by receiving a training signal from the other station and acquire knowledge of transmit power. The first alternative can provide a good estimate of the channel characteristics, but at the same time does the transmission of the characteristics of H take up valuable transmission resources. Therefore, a compromise between the increase in gain and the increase in control signalling over payload signalling is typically considered in for example determining suitable update frequency for the characteristics of H. The latter alternative uses less transmission recourses, but relies on the assumption that the channel is reciprocal, i.e. that amplitude and phase are identical regardless of transmission direction. This is e.g. the case in a TDD channel (time division multiplexing) within the channels coherence time. This is particularly true, and of interest, when multiple antennas are used at a first station and only one (or fewer) antennas are used at the other station, as also the number of trailing sequences can be diminished. This is also of great interest for coherent combining based cooperative relaying, as potentially large number of relays (possibly equipped with only one or with few antennas) are exploited while communicating to a user with only one or a few antennas.

SUMMARY OF THE INVENTION

The reciprocity assumption, as discussed above and in the referenced documents, is widely accepted and used to effectively estimate the channel. However, in realistic situations, given e.g. non-perfect transmitter-receiver chains, the reciprocity might not hold. Thus, there is a obvious need for achieving a suitable estimate of the channel, for example characterised by the channel matrix H, wherein the estimate characterize the complete transmitter-air interface-receiver chain.

The object of the present invention is to provide a method, radio nodes, system and programs that overcomes the drawbacks of the prior art techniques. This is achieved by the a method as defined in claim 1, the system as defined in claim 21, the radio node as defined in claim 22 and the program product as defined in claim 18.

The method according to the invention provides a method of calibrating at least one first radio node in a wireless communication network. The communication network comprises at least a first radio node and a second radio node, which can be arranged to be in radio communication with each other. The calibration method is based on that at least one representation of radio channel characteristics has been exchanged from one radio node to the other.

One embodiment of the invention comprises the steps of:
transmitting channel estimation symbols, or pilots, from at least the second radio node to the first radio node over a radio channel;
calculating at least one representation of the radio channel characteristics in at least the second radio node;
exchanging at least one representation of the radio channel characteristics from one of the radio nodes to the other radio node;
compensating radio transmissions from the first radio node with at least one correction factor which is at least partly based on the exchanged representation of the radio channel characteristics.

The method may further, which corresponds to a further embodiment, comprises a step of:
estimating transmission errors in the second radio node, based on the received pilot signals in the first and second form, and calculating a correction vector with correction terms for respective antenna of the first radio node. Optionally the first radio node uses dedicated pilots which has been modified to facilitate the error estimation in the second radio node.

The communication system according to the present invention comprises at least a first radio node and a second radio node capable of transmitting and receiving radio signals and the first and second radio nodes can be arranged to be in radio communication with each other. The at least first radio node is calibrated with the aid of the second radio node, wherein the first radio node bases the calibration on at least one representation of radio channel characteristics which has been exchanged from second radio node.

The radio node according to the present invention is adapted for wireless communication in a wireless network. The network comprises at least a second radio node and the first radio node capable of and the second radio node are capable of transmitting and receiving radio signals and can be arranged to be in radio communication with each other. The at first radio node is calibrated with the aid of the second radio node, wherein the first radio node bases the calibration on at least one representation of radio channel characteristics, which has been exchanged from second radio node.

According to one embodiment of the invention the radio node comprises calibration initiating means for identifying a need for calibrating the radio node, channel estimating means for producing radio channel estimates from radio signals received by the first radio node, and exchanging means for exchanging representations of the radio channel estimates or correction terms/vectors to other radio nodes. The channel estimating means and the exchanging means are preferably in communication with the receiver, and with calculating means for calculating a correction vector/term or a representation of a radio channel estimates, based on received radio channel estimate provided from the exchanging means and/or the internally determined channel estimate provided from the channel estimating means. The radio node further comprises pilot transmitting means for controlling the transmission of channel estimation symbols, or pilots, to the other radio nodes, and compensating means for compensating radio transmissions from the radio node with one, or a set of, correction factor(s). The transmitting means and the compensating means are preferably in communication with the transmitter, which also is in communication with the exchanging means. The compensating means is further in communication with the calculating means.

Thanks to the invention inaccuracies and differences in transmit receive chains can be compensated, whereby achieving reciprocity between the two radio nodes. The calibration may be used also in communication with other radio nodes and reciprocity is maintained also in these communications.

One advantage afforded by the present invention is, since reciprocity is ensured, that methods for optimizing coding and mapping at the transmitter which requires an accurate forward channel estimation, can be used.

The described methods have the additional advantage that it can be used for relative calibration between stations that cannot or don't communicate. A typical example is coherent combining based cooperative relaying.

Embodiments of the invention are defined in the dependent claims. Other objects, advantages and novel features of the invention will become apparent from the following detailed description of the invention when considered in conjunction with the accompanying drawings and claims.

BRIEF DESCRIPTION OF THE DRAWINGS

The invention will now be described in detail with reference to the drawing figures, wherein.

DETAILED DESCRIPTION OF THE INVENTION

Figure 1:
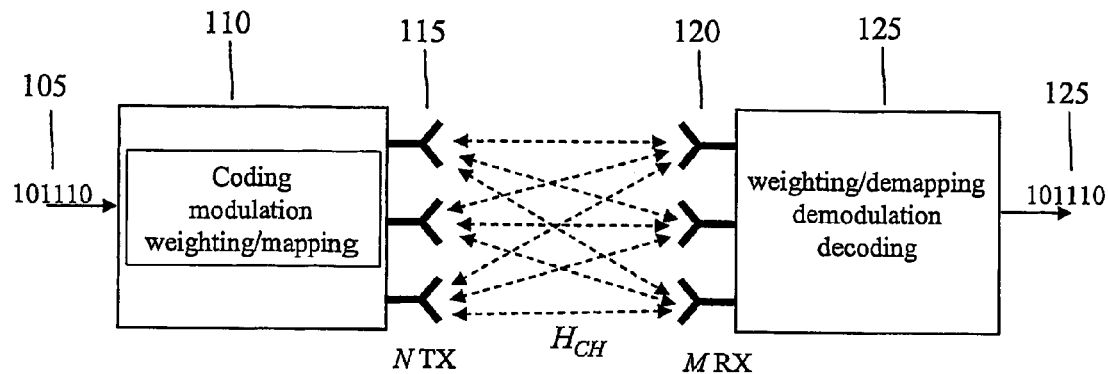
FIG. 1 is a schematic view of a multiantenna system (prior art)

Two nodes in a wireless communication network, station A 210 and station B 220, which are in simultaneous communication with each other, are schematically illustrated in FIG. 2. Station A 210 comprises a transmitter 212 and a receiver 214. Station B 220 comprises a transmitter 222 and a receiver 224. The transmitter 212 of the station A 210 and the receiver 224 of station B 220 makes up a first transmitter-receiver chain, and the transmitter 222 of the station B 220 and the receiver 214 of station A 210 the second. As previously described the transmission can be characterized by the channel matrix H, but as shown here in FIG. 2. it degenerates to a scalar complex valued channel. The end-to end channel for a transmitter-receiver chain may be described as consisting of essentially three parts relating to the transmitter, the air interface and the receiver. The parts relating to the transmitter and the receiver will be referred to as internal channels. This approach takes into account that the signal is affected not only in the air interface, but also in all parts of the transmitter-receiver chain such as in the transmitter/receiver and antenna feeders etc. The channel (in the frequency domain and hence generally a dependency with respect to frequency) from station A to B, in the example depicted in FIG. 2, may be described a $$H_{A \rightarrow B} = H_{A,TX} \cdot H_{CH} \cdot H_{B,RX}, \quad (2)$$

and the channel from B to A is $$H_{B \rightarrow A} = H_{B,TX} \cdot H_{CH} \cdot H_{A,RX} \quad (3)$$

wherein $H_{A,TX}$ characterize the transmitter 212 of station A 210, $H_{B,TX}$ characterize the transmitter 222 of station B 220, $H_{A,RX}$ is the channel matrix characterizing the receiver 214 of station A 210 and $H_{B,RX}$ characterize the receiver 224 of station B 220. $H_{CH}$ characterize the radio propagation channel. The terms relating to the transmitters and receivers $H_{A,TX}$, $H_{B,TX}$, $H_{A,RX}$ and $H_{B,RX}$ are not limited to the effect on the signal within the actual transmitter or receiver, they should preferably comprise a characterisation of all essential channel effects within respective station. The channels are here characterized with matrixes, which is relevant if any kind of MIMO communication is used. In particular, the transmit-receive chains are characterized as diagonal matrixes, whereas $H_{CH}$ is a full matrix. However, the observation that not only the air interface but also the transmitting/receiving parts effect the channel is valid also in other cases such as MISO, SIMO and SISO systems, for which the matrixes at the single antenna side reduces to a scalar. It is a fundamental property of an isotropic medium, such as the radio channel, that it exhibits reciprocity, reflected in that $H_{CH}$ is the same in both directions. However, since neither $H_{A,TX}$ can be assumed to be equal $H_{B,TX}$ nor $H_{A,RX}$ can be assumed to be equal $H_{B,RX}$, due to unavoidable differences in the components, the channel from station A 210 to station B 220, $H_{A \rightarrow B}$, can not be assumed to be equal the channel from station B 220 to station A, $H_{B \rightarrow A}$. In other words $H_{A \rightarrow B} \neq H_{B \rightarrow A}$ is generally valid and the channels are not reciprocal. Even if the equipment at one time is calibrated so what the internal channels $H_{A,TX} = H_{B,TX}$ and $H_{A,RX} = H_{B,RX}$ at that time, drift due to temperature, humidity, ageing of components, for example, will cause the channels to become non-reciprocal.

In the method according to the present invention external calibration of the transmitters and possibly also the receivers is introduced. This is possible because the transmitter and receiver internal channels $H_{A,TX}$, $H_{B,TX}$, $H_{A,RX}$ and $H_{B,RX}$ are stationary over long term and changes are primarily due to temperature drift, humidity etc. These changes typically occur on timescales such as hours, days, or at the fastest, minutes and can be consider as very slow compared to other characteristic timescales in the system such as changes in the air interface, power control changes and communication speed, for example. The calibration according to the invention may take place on a regular basis or as a response of a signal from a controlling entity upon, for example, a detected degradation in communication performance (such as throughput) or detection by other means. The communication between the calibration instances is only affected in the sense that calibration factors are included in each transmission.

Figure 2A:
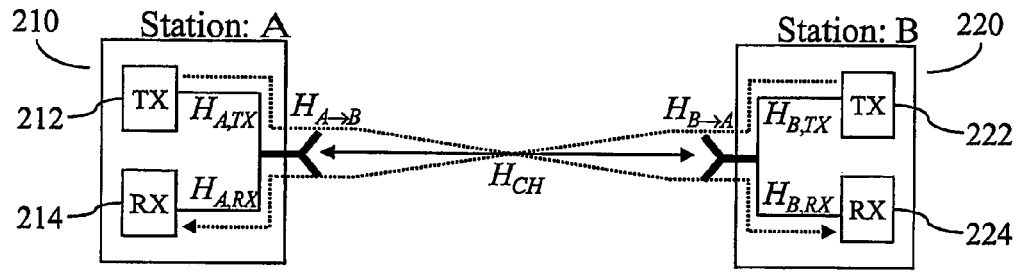
FIG. 2a is a schematic view of two radio nodes according to the invention engaged in communication.
Figure 2B:
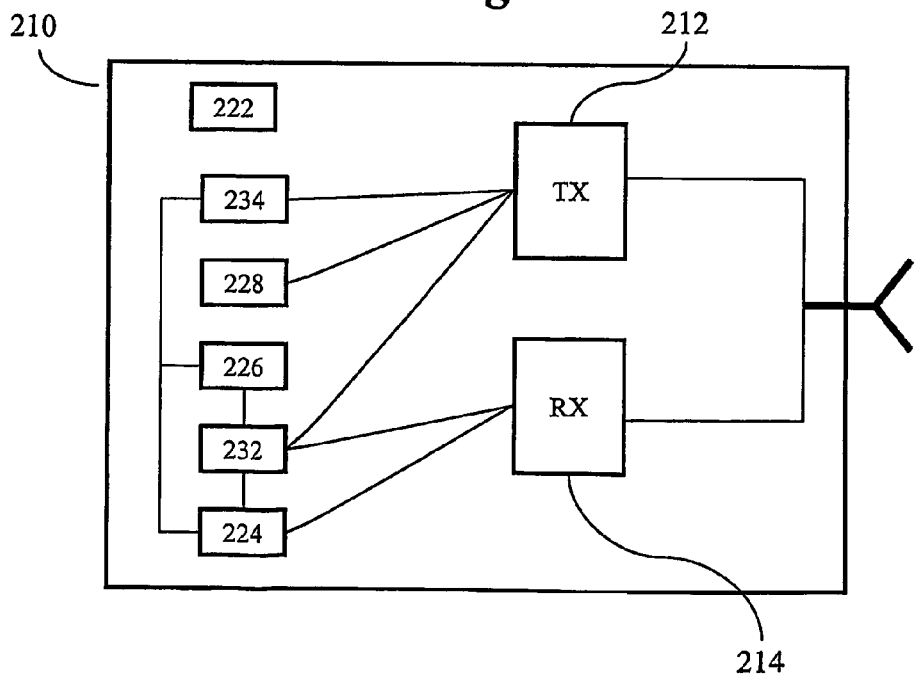
FIG. 2b is a schematic illustration of functional modules in a radio node according to the invention.

The radio node 210 described with reference to FIG. 2a is according to the present invention adapted to utilize the method according to the invention. A radio node capable to be calibrated and to participate in the calibration of another node, which is a preferred embodiment, is schematically depicted in FIG. 2b. The below described modules should typically be regarded as software defined functional modules in the digital processing parts of the radio node, i.e. not necessarily physical entities. The radio node preferably comprises a calibration initiating module 222 for identifying a need for calibrating the radio node, channel estimating module 224 for producing radio channel estimates from radio signals received by the first radio node, and exchanging module 232 for exchanging representations of the radio channel estimates or correction terms/vectors to other radio nodes. The channel estimating module 224 and the exchanging module 232 are preferably in communication with the receiver 214, and with calculating module 226 for calculating a correction vector/term or a representation of a radio channel estimates, based on received radio channel estimate provided from the exchanging module 232 and/or the internally determined channel estimate provided from the channel estimating module 224. The radio node further comprises pilot transmitting module 228 for transmitting channel estimation symbols, or pilots, to the other radio nodes, and compensating module 234 for compensating radio transmissions from the radio node with one, or a set of, correction factor(s). The transmitting module 228 and the compensating module 234 are preferably in communication with the transmitter 212, which also is in communication with the exchanging module 232. The compensating module 234 is further in communication with the calculating module 226. The functionality provided by the above described modules can be achieved by a plurality of different implementations, of which the above is a non-limiting example.

Figure 3:
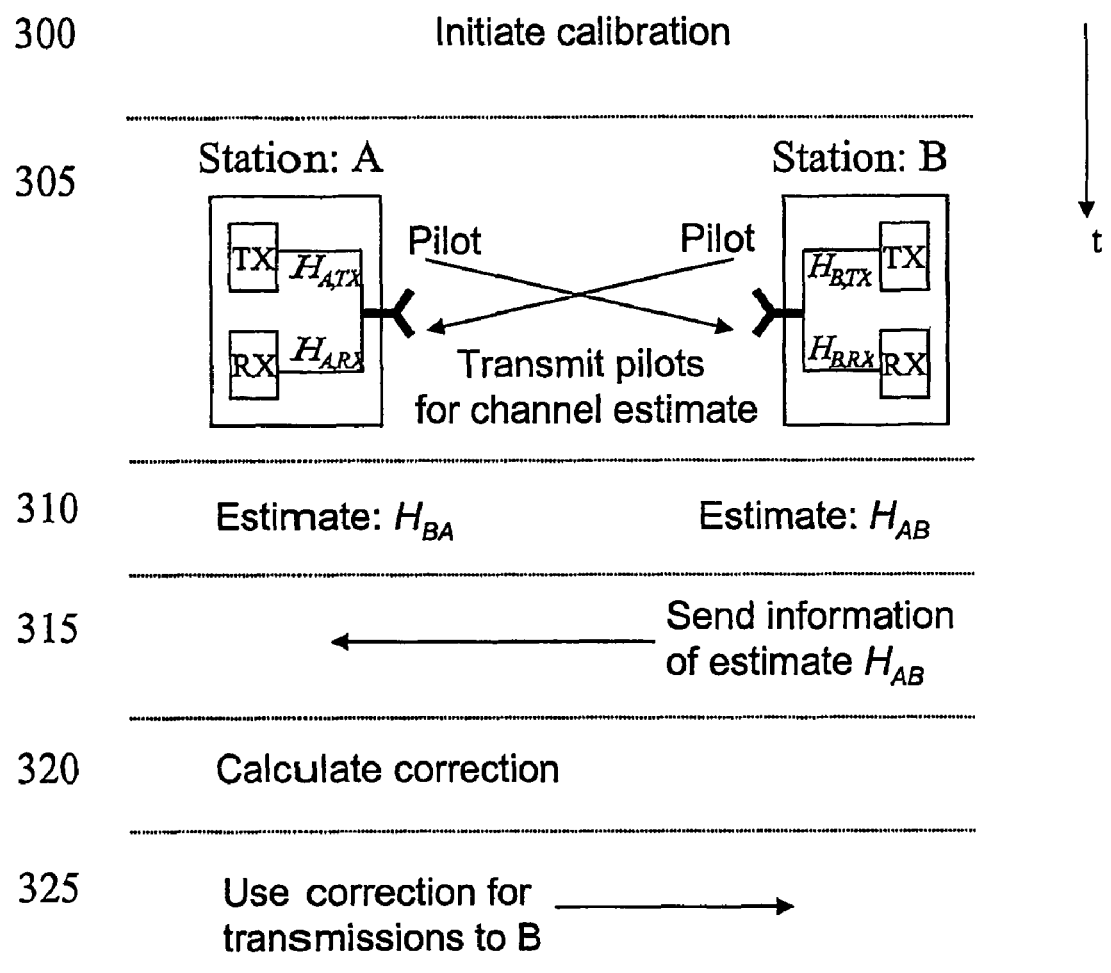
FIG. 3 is a message sequence chart illustrating the method according to the present invention.

The steps of the method according to the present invention, offering a method of external calibration of a station will be described with references to the message sequence chart of FIG. 3 and the schematic illustration of FIGS. 2a and b. In the exemplary system depicted in FIG. 2 only one transmitter and one receiver is provided in each station. The result of the steps is a calibration of the transmitter of station A. This is a non-limiting example and the inventive method is not limited to this case, on the contrary, as pointed out in the background section, to be able to use the reciprocal assumption is of very high importance in multiantenna systems, and the method easily extendable to such systems. The method of calibration comprises the steps of:

300: Initiate the calibration process.

The calibration process can be initiated in predetermined time intervals, wherein a suitable predetermined time interval can be set based on experience and assumptions on e.g. climate. Alternatively the calibration process can be initiated on demand from e.g. a system controlling entity, which has recorded some measure of communication degradation from one or more nodes, e.g. a high average BER or a change in average BER. The calibration may also be triggered based on climatic changes, such as surrounding temperature or temperature changes of communication equipment. Moreover, the transmitter also has knowledge of transmission history (time and duration of transmission), used transmit power as well as potential future transmission and can use this to trigger any calibration. Further, calibration errors (such as phase deviations) may be detected at the receiver for each transmit antenna, and when exceeding a predetermined threshold of deviation a calibration event is instantiated. The need for calibration is typically recognized in the calibration initiating module 222 of the radio node, but may be detected external from the radio node, and the radio node informed, by suitable means, of a required calibration.

305: Transmit channel estimation symbols, P.

Channel estimation symbols i.e. symbols known by both the transmitter and receiver, e.g. in the form of a pilot signal, are transmitted from station B 220 to station A 210, and/or from station A 210 to station B 220. Many systems have an existing common pilot channel that can be used for the calibration purpose. Pilot transmitting module 228 controls the transmission of pilots.

310: Channel estimation.

Calculate a channel estimate $\hat{H}$ from the result of the transmission of P, which channel estimate $\hat{H}$ comprises the complete transmitter-air interface-receiver chain. $\hat{H}_{A \to B}$, the channel estimate for a signal from station A 210 to station B 220, and/or $\hat{H}_{B \to A}$, the channel estimate from station B 220 to station A 210, may preferably be calculated. The channel estimating module 224 of the radio node performs the estimations.

315: Exchange information between stations.

The stations exchange information extracted from the channel estimate(s) $\hat{H}_{A \to B}$ and/or $\hat{H}_{B \to A}$ in order to facilitate a calculation of a correction factor to be used for the transmission by station A. Preferably, the receiving station (station B 220) sends a representation of the channel estimate $\hat{H}_{A \to B}$ to station A 210, or alternatively station B 220 sends a representation of a correction factor. The representations are preferably sent in a compact form, in order to not take up more transmission resources than necessary. The exchanging module 232 prepares and controls the exchange of information relating to the radio channels between different nodes.

320: Calculate channel correction factor.

A channel correction factor, taking into account the exchanged information on channel estimates, is calculated in calculating module 226.

325: Compensate transmission with channel correction factor.

Station A 210 compensates every transmission to B with the channel correction factor, giving an effective channel $H_{A \to B}^{(eff)}$. Since channel reciprocity holds, $H_{A \to B}^{(eff)} = H_{B \to A}$, with the compensated transmission, station A 210 may now measure on pilots (channel estimation symbols) from B for the estimate of $H_{B \to A}$ needed to e.g. enhance coding and mapping. The channel correction factor is used at least until a new calibration process is initiated. The compensation can be seen as an adjustment of the transmitter 212 controlled by the compensating module 234.

The calibration process has been exemplified with a calibration of the transmitter in station A, to give reciprocal conditions for the communication to and from station B. Naturally, the calibration process can be used to calibrate station B. The calibration process described above can be extended to a multiantenna (multi TX and/or RX systems. This will be further discussed in the below description of different embodiments of the invention. It has further been assumed that non-linear characteristics, e.g. due to non-linear power amplifier operation, can be neglected.

The above described calibration process may readily be adapted to different implementations of wireless networks. Such adoptions will be exemplified with different embodiments of the invention.

Figure 4:
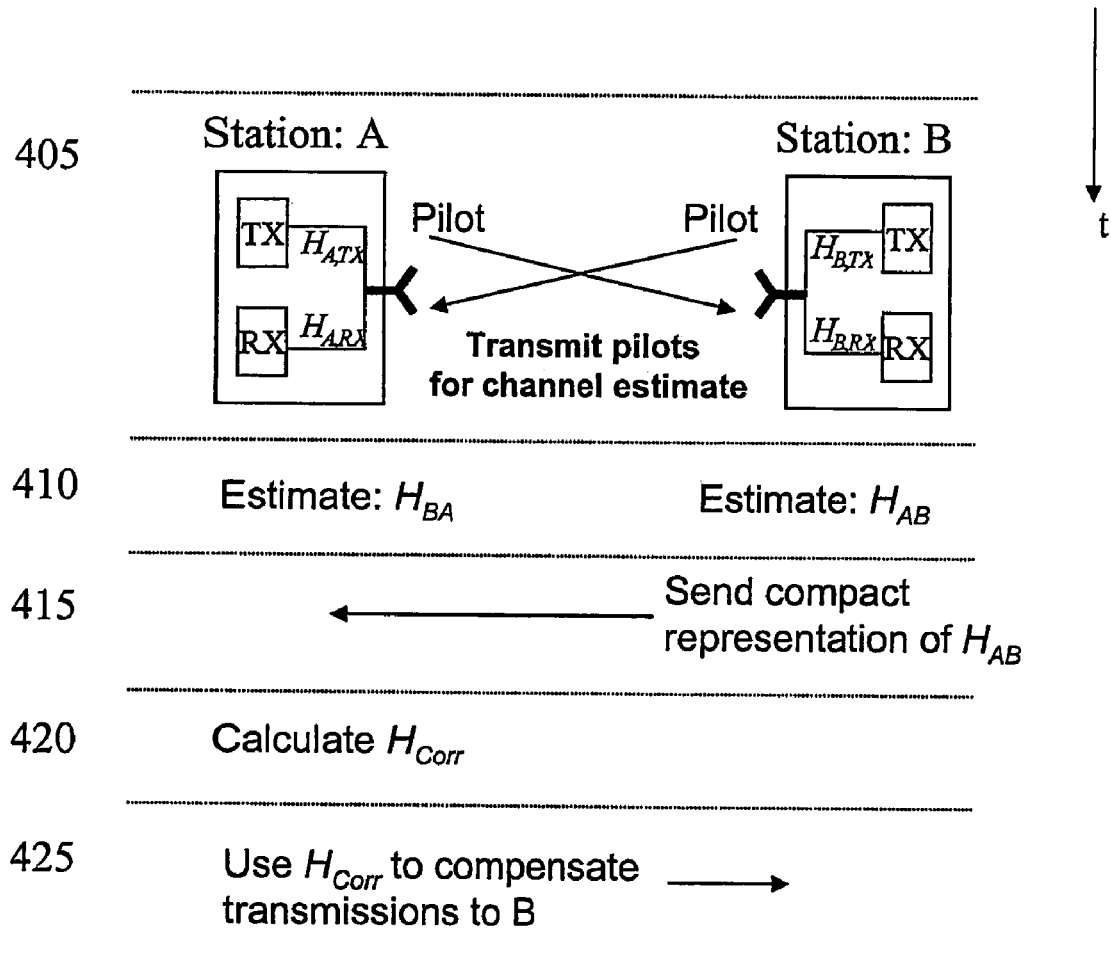
FIG. 4 is a message sequence chart illustrating the method according to a first embodiment of the present invention.

In a first embodiment of the method according to the present invention, described with references to FIG. 4, channel estimation symbols are sent both from station A 210 to station B 220 and from station B to station A. Therefore estimates in both directions, $\hat{H}_{A \to B}$ and $\hat{H}_{B \to A}$, can be produced (corresponding to step 310).

After the channel estimation the stations exchange its channel estimation data, e.g. station B send $\hat{H}_{A \to B}$ to station A (step 315). Based on $\hat{H}_{B \to A}$ already available at station A and the received $\hat{H}_{A \to B}$, a channel correction factor can be determined (step 320) according to:

$$H_{Corr} = \frac{\hat{H}_{B \to A}}{\hat{H}_{A \to B}} = \frac{\hat{H}_{B,TX} \cdot \hat{H}_{CH} \cdot \hat{H}_{A,RX}}{\hat{H}_{A,TX} \cdot \hat{H}_{CH} \cdot \hat{H}_{B,RX}} = \frac{\hat{H}_{B,TX} \cdot \hat{H}_{A,RX}}{\hat{H}_{A,TX} \cdot \hat{H}_{B,RX}} \quad (4)$$

A signal S, to be transmitted from A to B, is pre-multiplied with $H_{Corr}$ resulting in the received signal (step 325):

$$R = H_{A \to B} \cdot H_{Corr} \cdot S + N \quad (5),$$

where N is receiver noise. It is seen that the effective channel is modified into the reverse channel according to:

$$\begin{aligned} H_{A \to B}^{(eff)} &= H_{A \to B} \cdot H_{Corr} \quad (6) \\ &= H_{A,TX} \cdot H_{CH} \cdot H_{B,RX} \cdot \frac{\hat{H}_{B,TX} \cdot \hat{H}_{A,RX}}{\hat{H}_{A,TX} \cdot \hat{H}_{B,RX}} \\ &\approx H_{B,TX} \cdot H_{CH} \cdot H_{A,RX} \\ &= H_{B \to A} \end{aligned}$$

Hence as $H_{A \to B}^{(eff)} = H_{B \to A}$, the channels are now reciprocal, it is possible to use the estimate of the channel in direction B to A, perform any operation on the signal to be transmitted based on $H_{B \to A}$ and sending the it over the effective channel $H_{A \to B}^{(eff)}$ from A to B.

The embodiment of the invention preferably comprises, as illustrated in the message sequence chart of FIG. 4, the steps of:

405 (corresponding to step 305): Transmit channel estimation symbols, P.

Pilot signals are transmitted from station B 220 to station A 210, and from station A 210 to station B 220.

410 (310): Channel estimation.

$\hat{H}_{A \to B}$ is calculated at station B 220 and $\hat{H}_{B \to A}$ is calculated at station A 210.

415 (315): Exchange information between stations.

Station B 220 sends a representation of the channel estimate $\hat{H}_{A \to B}$ to station A 210, preferably in a compact form. A compact representation can be used as the major characteristics of the cannel are known, e.g. from $\hat{H}_{B \to A}$, and only part of the estimate, e.g. significant deviations, need to be transmitted.

420 (320): Calculate channel correction factor.

Station A 210 calculate the correction factor, $H_{Corr}$, according to equation (4).

425 (325): Compensate transmission with channel correction factor.

Station A 210 compensates every transmission to B with the channel correction factor $H_{Corr}$, giving an effective channel $H_{A \to B}^{(eff)}$, which ensures, as shown in equation (6), reciprocity.

The embodiment may be extended to MIMO by performing the same procedure for each antenna element combinations. With M TX and N RX antennas, the total number of calibrations is M times N.

Figure 5:
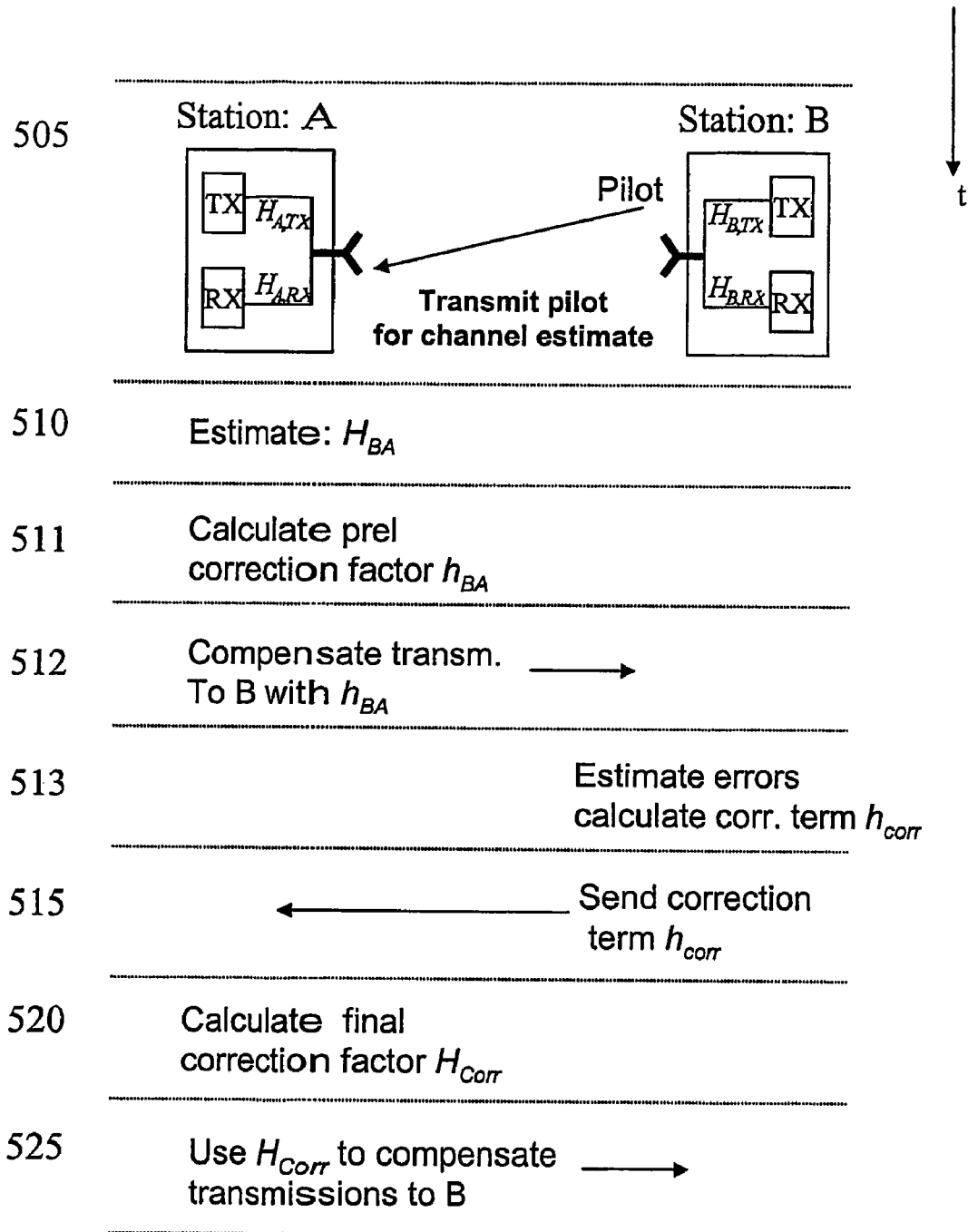
FIG. 5 is a message sequence chart illustrating the method according to a second embodiment of the present invention.

In a second embodiment of the method of the invention, described with references to the signalling scheme of FIG. 5, estimation symbols, or pilot, is transmitted in one direction only. In this embodiment, station A 210 first perform an open loop channel estimation by receiving a training symbol from station B. Based on the estimated channel, subsequent transmission form A to B is pre-multiplied with inverse of the channel estimate. Based on this, station B can report a correction factor back to station A. The correction factor is used for every transmission until next calibration instance. This is in essence a so called zero forcing scheme resulting in proportionally larger power is assigned to frequencies (assuming a frequency selective channel and e.g. OFDM) with high attenuation. Possibly, one may avoid using high attenuation frequencies.

The correction factor fed back can preferably be in the form of a low order complex polynomial (possibly with exponential functions for any delays) and hence only a few weighting factors are sent back. Delay, phase and amplitude difference will generally be small in magnitude and well behaved functions, it is therefore generally sufficient to use a low order polynomial. Other methods of compression the correction factor may, as appreciated by the skilled in the art, also be used.

As an alternative the transmissions from A to B is pre-multiply with the complex conjugate of $\hat{H}_{B \to A}$. This alternative does not experience the problem with high attenuation frequencies as for the zero-forcing method. The receiver, i.e. station B, must however take into account that the received signal is, apart from the phase and amplitude errors to be calibrated, attenuated with $|H_{CH}|^2$ when determining the correction factor that is fed back to station A. However, the most important is the feedback of the phase errors, as the amplitude gain of the transmit receiver chains does generally not vary so much as the channel gain $|H_{CH}|$.

The second embodiment of the invention preferably comprises, as illustrated in the message sequence chart of FIG. 5, the steps of:

505 (corresponding to step 305): transmit channel estimation symbols, P.

Pilot signals are transmitted from station B 220 to station A 210 only.

510 (310): Channel estimation.

$\hat{H}_{B \to A}$ is estimated at station A 210.

511: Calculate preliminary correction factor.

A preliminary correction factor, $h_{AB}$, is calculated based on $\hat{H}_{B \to A}$, preferably the inverse of the channel estimate, $\hat{H}_{B \to A}^{-1}$, or its complex conjugate, $\hat{H}_{B \to A}^*$.

512: Compensate transmissions.

The transmissions from station A to station B are compensated by multiplying the signal with the preliminary correction factor $h_{AB}$.

513: Estimate errors.

Station B 220 estimate phase and amplitude errors in the transmission compensated with the preliminary correction factor. From the estimates station B calculates a correction term $h_{Corr}$. For the $\hat{H}_{B \to A}^{-1}$, the correction factor is simply complex conjugate effective channel when $\hat{H}_{B \to A}^{-1}$ is concatenated with $H_{A \to B}$. For the $\hat{H}_{B \to A}^*$ case, the complex conjugate of the phase error may for instance be signaled back, hence assuming that insignificant magnitude deviations occur due to the transmit receiver chains.

515 (315): Exchange information between stations.

Station B 220 sends the correction term $h_{Corr}$ to station A 210, preferably in a compact form.

520 (320): Calculate channel correction factor.

Station A 210 calculate a final correction factor, $H_{Corr}$, based on the preliminary correction factor $h_{AB}$ and the correction term $h_{Corr}$.

525 (325): Compensate transmission with channel correction factor.

Station A 210 compensates every transmission to B with the final channel correction factor $H_{Corr}$, giving an effective channel which ensures reciprocity.

Figure 6:
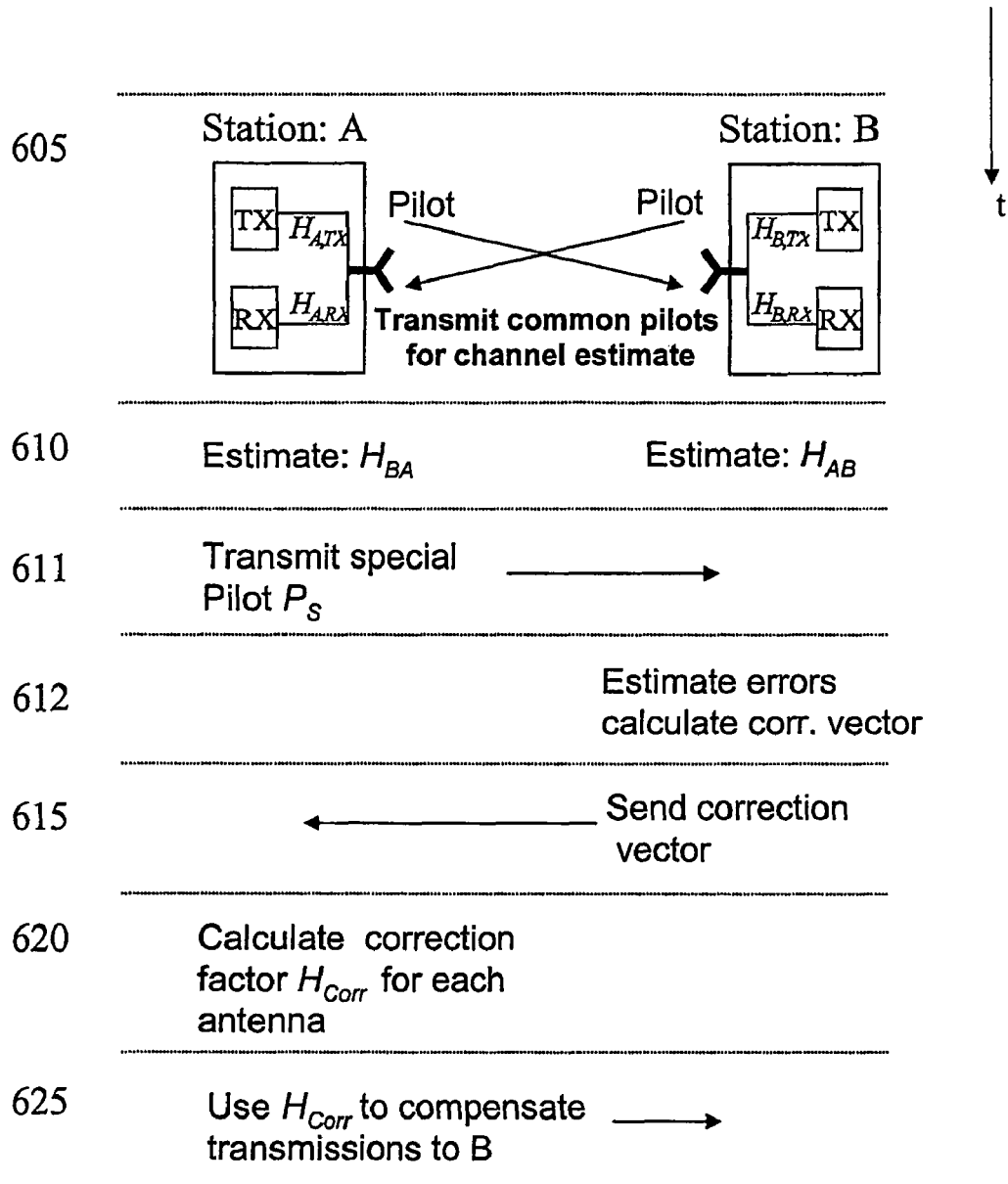
FIG. 6 is a message sequence chart illustrating the method according to a third embodiment of the present invention.

In a third embodiment of the method of the present invention, described with references to the signalling scheme of FIG. 6, special estimation symbols (or pilot channel) is used in addition to the existing common pilot channel, to estimate a correction vector.

In for example, a MIMO scenario in which station A has $n_A$ antennas and station B has $n_B$ antennas, the frequency responses of the transceiver chains can be represented by diagonal matrices with elements corresponding to the response between the baseband processor and a particular antenna. For example, $H_{A,TX}$ is an $n_A$ by $n_A$ diagonal matrix and the channel's response is now an $n_B$ by $n_A$ matrix as seen by station B.

Following the example of calibrating station A through station B, similar to the first two embodiments, the channels from station A to station B can be estimated by station B through a known signal (a frequency domain column vector of dimension $n_A$) generally referred to as the common pilot channel and here denoted by $P_c$. The at station B received signal corresponding to this pilot is given by $$R_d = H_{B,RX} \cdot H_{CH} \cdot H_{A,TX} \cdot P_c, \qquad (7)$$

and from which the effective channel response $\hat{H}_{A \to B} = H_{B,Rx} H_{CH} H_{A,TX}$ can be estimated. Station A can similarly derive $H_{B \to A}{}^T = H_{B,TX} H_{CH}{}^T H_{A,RX}$. It then transmits from each antenna a pre-multiplied special pilot signal, collectively denoted by a column vector $$P_s \cdot H_{B \to A}{}^* \cdot 1_{n_B}, \qquad (8)$$

wherein, $P_s$ is an $n_A \times n_A$ diagonal matrix containing $n_A$ individual pilot signals with good auto and cross correlation properties and $1_{n_B}$ is an all-one column vector of dimension $n_B$. The received signal corresponding to this special pilot signal is then given by $$R_s = H_{B,Rx} \cdot H_{CH} \cdot H_{A,TX} \cdot P_s \cdot H_{A,RX}{}^H \cdot H_{CH}{}^H \cdot H_{B,TX}{}^H \cdot 1_{n_B}, \qquad (9)$$

For simplicity, one may assume that $n_B=1$ (the two stations may agree to use only one antenna in B to calibrate A), then the received signal in the above equation can be written as $$R_s = H_{B,Rx} \cdot H_{B,TX}^H \cdot \sum_{j=1}^{n_A} H_{A,TX}(j,j) \cdot H_{A,RX}^H(j,j) \cdot P_s(j,j) \cdot |H_{CH}(1,j)|^2 \qquad (10)$$

Since the transceiver chain's frequency response contains only delay, phase rotation and perhaps a small amplitude variation, $H_{B,RX}$ and $H_{A,TX}$ in Eq. (7) both have unit amplitude. Therefore $|H_{CH}|=|H_{A \to B}|$ is known from the common pilot signal $P_c$ and the correction term $H_{A,TX}(j,j) \cdot H_{A,RX}{}^H(j,j)$ for each antenna in station A can be estimated by correlating the received signal $R_s$ with the corresponding pilot signal $P_s(j,j)$. After receiving this correction information from station B, station A can then adjust the transmit and receive chains such that $H_{A,TX}(j,j) \cdot H_{A,RX}{}^H(j,j)$ are the same for all j. This makes sure that the channels are reciprocal between the antennas at station B and the baseband processor in station A. Note that the responses of the transceivers in station B is irrelevant for the purpose of coherently adding the arriving signals at the antennas since they can be estimated and removed before demodulation.

The third embodiment of the invention preferably comprises, as illustrated in the message sequence chart of FIG. 6, the steps of:

605 (corresponding to step 305): Transmit channel estimation symbols, P.

Known channel estimation symbols, preferably the existing common pilot channel, $P_c$, are transmitted from station B 220 to station A 210 and from station A 210 to station B 220.

610 (310): Channel estimation.

$\hat{H}_{B \to A}$, is estimated at station A 210, and $\hat{H}_{A \to B}$ at station B 220 according to the above.

611: Transmit special pilot channel $P_S$.

Station A transmits from each antenna a pre-multiplied special pilot signal, $P_S \cdot H_{B \to A}{}^* \cdot 1_{n_B}$.

612: Estimate errors.

Station B 220 estimate delay, phase and amplitude errors for each of the station A's antennas, based on the received $P_C$ and $P_S \cdot H_{B \to A}{}^* \cdot 1_{n_B}$. A correction vector comprising correction terms for each antenna in station A is calculated.

615 (315): Exchange information between stations.

Station B 220 sends the correction vector to station A 210.

620 (320): Calculate channel correction factor.

Station A 210 calculate channel correction factors for each antenna.

625 (325): Compensate transmission with channel correction factor.

Station A 210 compensates every transmission to B with the channel correction factors ensuring reciprocity.

Figure 7:
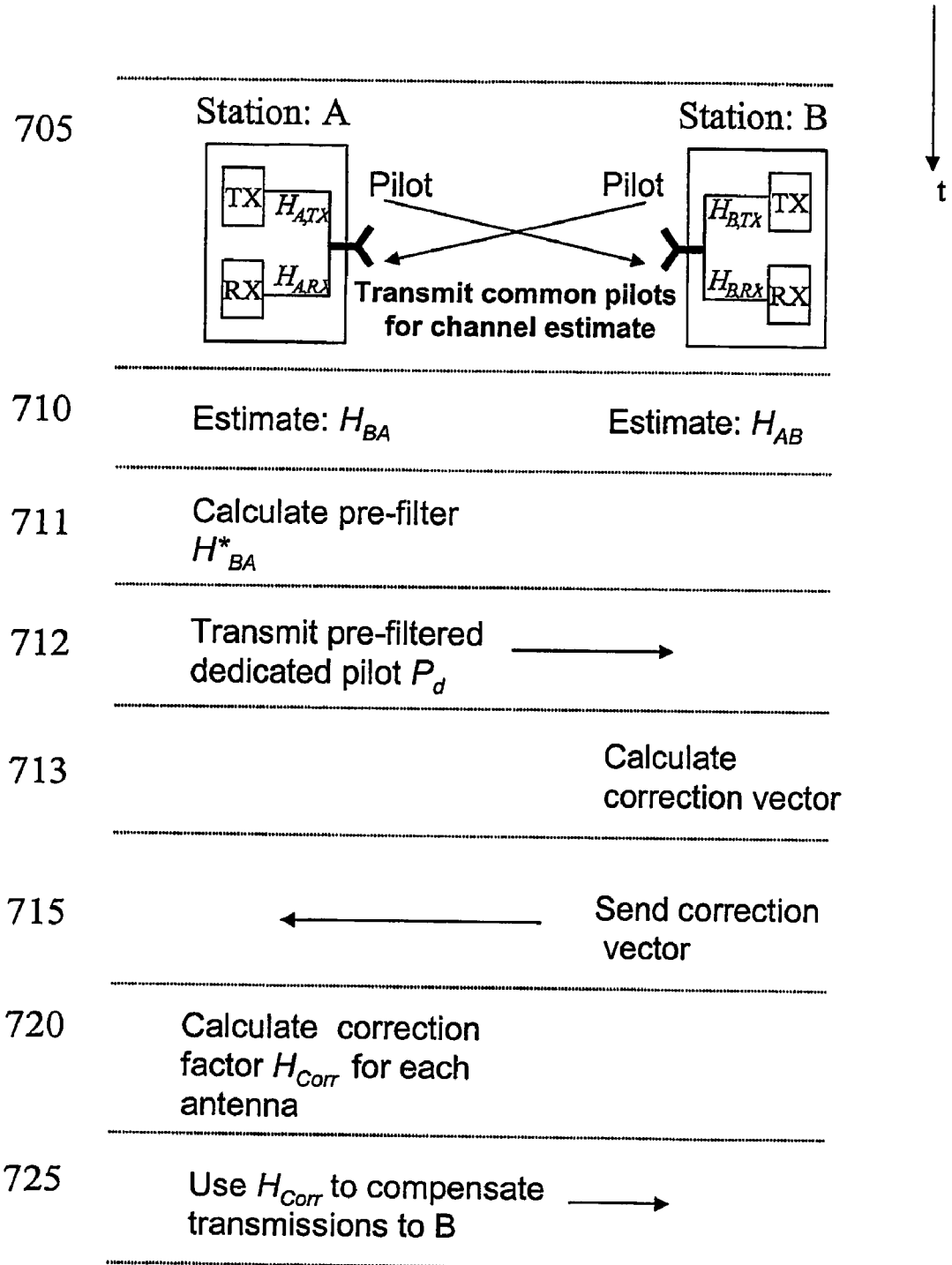
FIG. 7 is a message sequence chart illustrating the method according to a fourth embodiment of the present invention.

A fourth embodiment of the invention, described with references to the signalling scheme of FIG. 7, relates to the cases of SVD (Singular Value Decomposition) based MIMO or TDRF, and utilize a dedicated pilot channel in combination with the existing common pilot channel. The transmit side (station A 210 for example) performs channel matching pre-filtering so that the signals add up coherently when arriving at the antennas of the receive side (station B 220). The received signal at station B is given by $H_{A \to B} \cdot H_{B \to A}{}^* \cdot S$, where S is a column vector of dimension $n_B$ containing the data symbols. The pre-filtering function is the complex conjugate of the channel from station B to A and can be estimated by the common pilot channel sent by station B.

In general, known symbols are multiplexed with data symbols so that the effective channel response can be estimated for coherent demodulation. These known symbols are sometimes referred to as dedicated pilot channel and is here denoted by, $P_d$. In combination with the common pilot channel $P_c$, the dedicated pilot channel will be used to derive the correction vector as will be shown below.

At station B, the received signal corresponding to the dedicated pilot channel is given by $$R_s = H_{A \to B} \cdot H_{B \to A}{}^* \cdot P_d \qquad (11)$$

Since $H_{A \to B}$ is known from the common pilot $P_c$, $H_{B \to A}{}^*$ can be estimated from $R_s$. Therefore $$H_{A \to B} = H_{B,Rx} \cdot H_{CH} \cdot H_{A,TX}$$

$$H_{B \to A}{}^* = H_{A,RX}{}^H \cdot H_{CH}{}^H \cdot H_{B,TX}{}^H \qquad (12)$$

are both known to station B and the correction vector can be generated and reported back to station A as in the previous embodiments.

The fourth embodiment of the invention preferably comprises, as illustrated in the message sequence chart of FIG. 7, the steps of:

705 (corresponding to step 305): Transmit channel estimation symbols, P.

Known channel estimation symbols, preferably the existing common pilot channel, $P_c$, are transmitted from station B 220 to station A 210 and from station A 210 to station B 220.

710 (310): Channel estimation.

$H_{B \to A}$ is estimated at station A 210, and $H_{A \to B}$ at station B 220 from the pilot channel.

711: Calculate pre-filter.

Station A 210 calculate pre-filter $H_{B \to A}^*$.

712: Transmit dedicated pilot channel $P_d$.

Station A transmits dedicated pilot channel $P_d$ multiplied with $H_{B \to A}^*$, which at station B is received as $R_s = H_{A \to B} \cdot H_{B \to A}^* \cdot P_d$.

713: Estimate correction vector.

$H_{B \to A}^*$ and $H_{A \to B}$ are now known by station B 220, and used to estimate a correction vector.

715 (315): Exchange information between stations.

Station B 220 sends the correction vector to station A 210.

720 (320): Calculate channel correction factor.

Station A 210 calculate channel correction factors for each antenna.

725 (325): Compensate transmission with channel correction factor.

Station A 210 compensates every transmission to B with the channel correction factors ensuring reciprocity.

Figure 8:
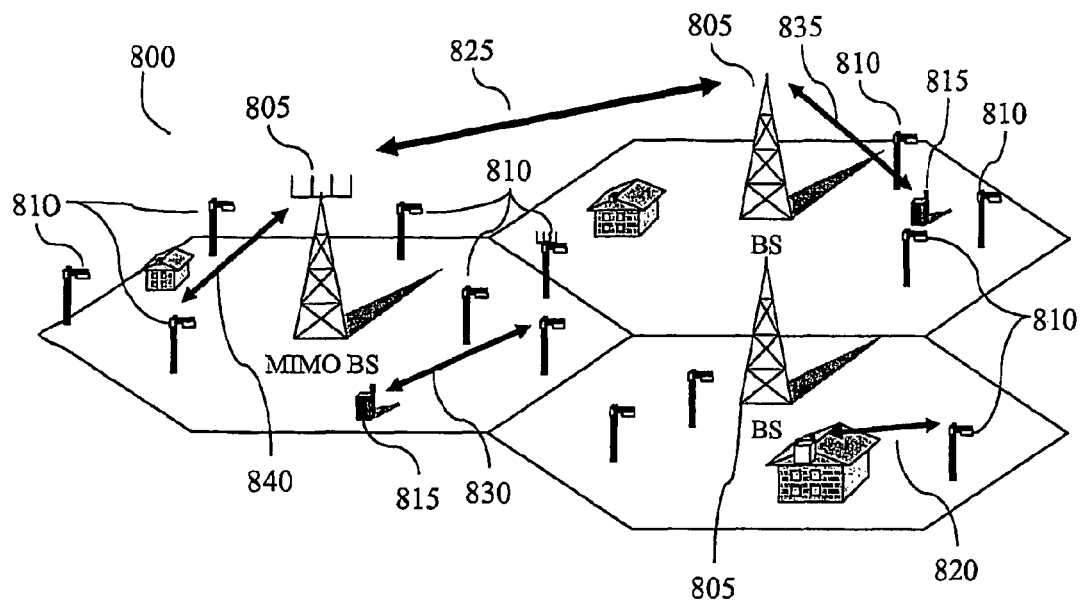
FIG. 8 is a schematic view of wireless system wherein entities uses the calibration method according to the present invention.

The calibration method according to the invention can be utilized, as indicated in the different embodiments, in various wireless systems, as well as in-between various entities (nodes) in the systems. FIG. 8 illustrates various examples of nodes in-between which calibration may take place. The exemplary network 800 comprises a plurality of basestations 805 (both multiple antenna and single antenna), relay stations 810 and mobile stations 815. Calibration may e.g. take place between two relay stations 810 (indicated by arrow 820), between two basestations 805 (arrow 825), between a relay station 810 and a mobile station 815 (arrow 830), between a base station 805 and a mobile station 815 (arrow 835), and between a base station 805 and a relay station 810 (arrow 840). Other combination of radio based nodes for the purpose of calibration according to the invention is also possible. Furthermore, some stations may be equipped with multiple antennas, whereas others have merely single antennas. The calibration should be performed in accordance with the specific antenna configuration. Choices of which node to calibrate with may be dictated by selection rules incorporated in the system, e.g. based on link quality, knowledge of calibration accuracy offered by some stations (it may e.g. differ between fixed stations and mobile stations), number of antennas, etc.

It should be emphasised that although the calibration takes place between some pair of stations, the calibrated entities may subsequently communicate with other stations. For instance in coherent combining based cooperative relaying, relay stations may perform calibration with a proximate basestation, and later while communicating relaying signals received on one link (e.g. from a basestation) to a second link (e.g. with a receiving mobile station) the compensation according to the invention and phase compensation derived from channel estimates (see [ref]) is applied that enables signals relayed over different relays to be coherently combined at the receiving entity.

Figure 9:
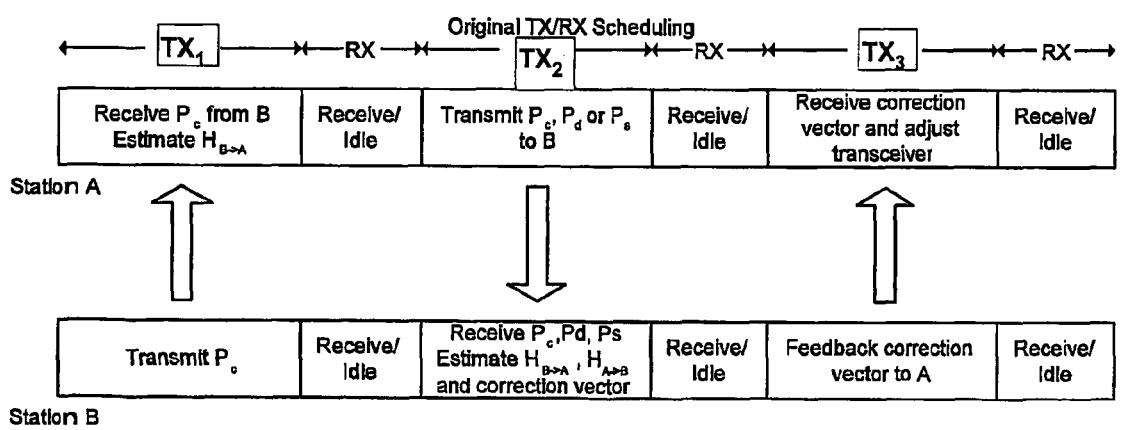
FIG. 9 is a schematic illustration of transmissions between two entities using the method according to the present invention.

A possible implementation of the calibration method according to the invention is illustrated in FIG. 9, wherein the system is in TDD mode. The calibration method described above may preferably be carried out by two stations that are assigned to opposite transmit/receive time slots. In a cellular system, this means between a base station and a user terminal. However, calibration may, as previously discussed, also take place between nodes that are assigned the same transmit/receive time slots, e.g. between to basestations. FIG. 9 illustrates an example of calibration procedure in a TDD system between two basestations. In order not to disrupt the ongoing operation, no station should transmit in a time slot originally allocated for receiving. Therefore, a base station can switch to receive mode during a slot originally scheduled for transmission and measure the pilot channels from other base stations.

Illustrated in FIG. 9 are the transmissions between station A and station B, wherein:

a) In a first transmit time slot $TX_1$, station B transmit a pilot, $P_C$, which is received by the station A, which has switched to receive mode. Station A estimates $H_{B \to A}$.

b) In a second transmit time slot $TX_2$, station A transmit a pilot, $P_C$, $P_d$ or $P_S$ which is received by the station B, which has switched to receive mode. Station B estimates $H_{A \to B}$, and possibly $H_{B \to A}$, and determines a representation of $H_{A \to B}$ or a correction vector/term.

c) In a third transmit timeslot $TX_3$, station B, in regular transmit mode, transmit the correction vector to station A, which has switched to receive mode. Station A adjust the transceivers accordingly.

The calibration transmission does not need to occur in adjacent TX-slots, and calibration process may involve additional transmissions that is not depicted in FIG. 9.

Utilising the method of calibration according to the invention it is possible to compensate transmissions so that the communication channels between two radio nodes in a wireless network are reciprocal. The presented embodiments offers methods of performing the calibration process in very efficient ways, ensuring that valuable radio resources are not wasted on unnecessary signalling. The reciprocity achieved by the inventive calibration process makes it possible to fully exploit the capacity gains afforded by features such as space-time coding used in the newly developed radio communication systems e.g. MIMO, TDRF and coherent combining based cooperative relaying.

The method according to the present invention is preferably implemented by means of program products or program module products comprising the software code means for performing the steps of the method. The program products are preferably executed on a plurality of radio nodes within a network. The program is distributed and loaded from a computer usable medium, such as a floppy disc, a CD, or transmitted over the air, or downloaded from Internet, for example.

As demonstrated, and exemplified in the different embodiments, the present invention provides a method and radio nodes that makes it possible to use channel reciprocity, in that it compensate for inaccuracies and differences in transmit receive chains.

The described methods have the additional advantage that it can be used for relative calibration between stations that can not or do not communicate. A typical example is coherent combining based cooperative relaying.

While the invention has been described in connection with what is presently considered to be the most practical and preferred embodiments, it is to be understood that the invention is not to be limited to the disclosed embodiments, on the contrary, is intended to cover various modifications and equivalent arrangements as defined by the appended claims.

The invention claimed is:

1. A method of calibrating a transmitting part of a node in a wireless communication network, which communication network comprises at least a first radio node and a second radio node which can be arranged to be in radio communication with each other, and wherein at least one radio node receives radio signals from multiple antennas, said calibration method comprises the steps of transmitting first pilots signals both from the first radio node to the second radio node and from the second radio node to the first radio node;

determining in the second radio node a first estimate of the channel characteristics from the first radio node to the second radio node, and in the first radio node determining a second estimate of the channel characteristics from the second radio node to the first radio node, said determining based on respective received first pilot signals;

calculating at least one channel correction factor in the first radio node based on the first and second channel estimates, transmitting a modified second pilot signal from the first radio node to the second radio node, said modification based on the second channel estimate;

estimating transmission errors in the second radio node, said estimation based on the first channel estimate and the received second pilot signal and calculating a correction vector with correction terms for each of the multiple antennas based on the transmission errors;

exchanging the correction vector from the second radio node to the first radio node; and in that the step of calculating correction factors comprises calculating one correction factor for each antenna, the correction factors are based at least partly on the respective correction terms in the correction vector, said correction factors adapted for use in transmissions from the first radio node to the second radio node.

2. Calibration method according to claim 1, wherein the calibration method is initiated in predetermined time intervals.

3. Calibration method according to claim 1, wherein the calibration method is initiated as a response of a measure of communication quality being below a predetermined threshold value.

4. Calibration method according to claim 1, wherein the modification of the second pilot signal comprises a multiplication of a pilot signal with the complex conjugate of the second channel estimate.

5. Calibration method according to claim 1, wherein the correction vector is exchanged in the form of a compact representation of the correction vector.

6. Calibration method according to claim 1, wherein the first radio node is provided with $n_A$ antennas and the second radio node is provided with $n_B$ antennas and wherein at least the first radio node has at least two antennas, wherein in the first transmitting step the first pilot signals, $P_c$, are column vectors;

in the determining step a first estimate, $\hat{H}_{A \to B}$, of the channel characteristics from the first radio node to the second radio node is calculated in the second radio node, and a second channel estimate $\hat{H}_{B \to A}$ of the channel characteristics from the second radio node to the first radio node is calculated in the first radio node;

in the second transmitting step the second pilot, $P_s$, is pre-multiplied according to:

$$P_s \cdot H_{B \to A}^* \cdot 1_{n_B},$$

which at the second radio node will be received as $R_s$, and wherein $H_{B \to A}^*$ is the complex conjugate of the second channel estimate, $P_s$ is an $n_A \times n_A$ diagonal matrix containing $n_A$ individual pilot signals and $1_{n_B}$ is an all-one column vector of dimension $n_B$;

in the estimating step the correction vector is calculated based on $R_s$ and $H_{A \to B}$, and comprises error corrections terms for each of the first radio node's antennas; and in the calculating step channel correction factors for each antenna are calculated based on the correction vector.

7. Calibration method according to claim 1, wherein the first radio node is provided with $n_A$ antennas and the second radio node is provided with $n_B$ antennas and wherein at least the first radio node has at least two antennas, wherein the radio communication is based on Singular Value Decomposition (SVD), and in the first transmitting step the first pilot signals, $P_c$, are column vectors;

in the determining step a first estimate, $\hat{H}_{A \to B}$, of the channel characteristics from the first radio node to the second radio node is calculated in the second radio node, and a second channel estimate $\hat{H}_{B \to A}$ of the channel characteristics from the second radio node to the first radio node is calculated in the first radio node;

in the second transmitting step the second pilot, $P_d$, is pre-multiplied with a pre-filter, $H_{B \to A}^*$, which is the complex conjugate of the second channel estimate, which as the second radio node will be received as $$R_s = H_{A \to B} \cdot H_{B \to A}^* \cdot P_d;$$

in the estimating step the correction vector is calculated in the second node and based on $H_{B \to A}^*$ and $H_{A \to B}$, wherein $H_{A \to B}$ is estimated from the first pilot signal and $H_{B \to A}^*$ is estimated from $R_s$; and in the calculating step channel correction factors for each antenna are calculated based on the correction vector.

8. Calibration method according to claim 1, wherein the correction vector comprises representation of either delay-errors, phase-errors or amplitude-errors, or a combination of these errors.

9. Calibration method according to claim 1, wherein a first part of the step of transmitting channel estimation symbols is performed in a first transmit time slot $TX_1$, wherein the second radio node transmit a pilot, $P_c$, which is received by the first radio node, which is in a receive mode; and a second part of the step of transmitting channel estimation symbols is performed in a second transmit time slot $TX_2$, wherein the first radio node transmit a pilot, $P_c$, $P_d$ or $P_s$ which is received by the second radio node, which is in a receive mode.

10. Calibration method according to claim 9, wherein the step of exchanging information between radio nodes is performed in a third transmit timeslot $TX_3$, wherein the second radio node is in regular transmit mode and transmits information on the radio channel to the first radio node, which is in receive mode.

11. Calibration method according to claim 10, wherein the first radio node estimates the radio channel from the second radio channel to the first radio node, $H_{B \to A}$, in the first transmit time slot $TX_1$.

12. Calibration method according to claim 10, wherein the second radio node estimates the radio channel from the first radio channel to the second radio node, $H_{A \to B}$ in the second transmit time slot $TX_2$.

13. Calibration method according to claim 12, wherein the second radio node further estimates a correction vector or correction term in the second transmit time slot $TX_2$.

14. Calibration method according to claim 10, wherein the step of calculating correction factor or factors in the first radio node is performed in the third transmit timeslot $TX_3$.

15. A communication system for wireless communication, the system comprising at least a first radio node and a second radio node which can be arranged to be in radio communication with each other, at least one radio node can receive radio signals from multiple antennas wherein the first radio node is calibrated with the aid of the second radio node, the communication system comprising apparatus configured to:

transmit first pilots signals both from the first radio node to the second radio node and from the second radio node to the first radio node;

determine in the second radio node a first estimate of the channel characteristics from the first radio node to the second radio node, and in the first radio node, determine a second estimate of the channel characteristics from the second radio node to the first radio node, said determining being based on respective received first pilot signals;

calculate at least one channel correction factor in the first radio node based on the first and second channel estimates, transmit a modified second pilot signal from the first radio node to the second radio node, said modification based on the second channel estimate;

estimate transmission errors in the second radio node, said estimation being based on the first channel estimate and the received second pilot signal, and calculate a correction vector with correction terms for each of the multiple antennas based on the transmission errors;

exchange the correction vector from the second radio node to the first radio node; and wherein calculating correction factors includes calculating one correction factor for each antenna, the correction factors being based at least partly on correction terms in the corresponding correction vector, said correction factors being adapted for use in transmissions from the first radio node to the second radio node.

16. The communication system according to claim 15, wherein the at least one of the radio nodes of the system utilizes a multiantenna configuration as adapted for MIMO-based communication.

17. A radio node adapted for wireless communication in a wireless network, which network comprises at least one further radio node, the radio node comprises:

an exchanging module adapted for receiving at least one first radio channel estimate from at least the further radio node;

a channel estimating module adapted for producing a second radio channel estimate from a radio signal received by the radio node;

a calculating module adapted for calculating a correction vector/term or a representation of a radio channel estimates based on the received first radio channel estimate and the second radio channel estimate; and a compensating module for compensating radio transmissions from the radio node with at least one correction factor which is at least partly based on the calculated calibration, a pilot transmitting module adapted for controlling the transmission of first pilot signal and a second pilot signal, wherein the second pilot signal is modified with the second radio channel estimate.

18. The radio node according to claim 17, wherein the radio node further comprises means for initiating a calibration process, said initiating means adapted to initiate the calibration process in predetermine time intervals.

19. The radio node according to claim 17, wherein the radio node further comprises means for initiating a calibration process, said initiating means adapted to initiate the calibration process as a response of a measure of communication quality being below a predetermined threshold value.

20. The radio node according to claim 17, wherein the radio node utilizes a multiantenna configuration.

21. The radio node according to claim 17, wherein the radio node is a mobile station.

22. The radio node according to claim 17, wherein the radio node is a radio base station.

23. The radio node according to claim 17, wherein the radio node is a relay station.

\* \* \* \* \*

UNITED STATES PATENT AND TRADEMARK OFFICE
CERTIFICATE OF CORRECTION

| | |
|---|---|
| PATENT NO. | : 7,747,250 B2 |
| APPLICATION NO. | : 10/584917 |
| DATED | : June 29, 2010 |
| INVENTOR(S) | : Larsson et al. |

Page 1 of 1

It is certified that error appears in the above-identified patent and that said Letters Patent is hereby corrected as shown below:

In Column 2, Line 34, delete "preceding." and insert -- precoding. --, therefor.

In Column 3, Line 36, delete "trailing" and insert -- training --, therefor.

In Column 15, Line 4, in Claim 1, delete "pilots" and insert -- pilot --, therefor.

Signed and Sealed this
Twenty-fifth Day of January, 2011

David J. Kappos
*Director of the United States Patent and Trademark Office*